3,211,612
ANTICOCCIDIAL COMPOSITIONS AND METHOD
OF USING SAME
Edward F. Rogers, Middletown, N.J., and William J.
Leanza, Staten Island, N.Y., assignors to Merck & Co.,
Inc., Rahway, N.J., a corporation of New Jersey
No Drawing. Filed Jan. 14, 1963, Ser. No. 251,010
12 Claims. (Cl. 167—53.1)

This invention relates to novel compositions useful in the treatment and prevention of the poultry disease coccidiosis. It is concerned further with a novel method of controlling coccidiosis, and with animal feeds and feed supplements containing as an active anticoccidial agent certain 2,4-disubstituted derivatives of toluene.

Coccidiosis is a common and widespread poultry disease caused by species of protozoan parasites of the genus Eimeria. The more important of these species are *E. maxima, E. acervulina, E. tenella, E. necatrix, E. brunetti, E. praecox* and *E. mitis*. In turkeys, *E. meliadigris* and *E. adenoides* are also causative organisms of coccidiosis. When left untreated, the severe forms of the disease lead to poor weight gain, reduced feed efficiency and high mortality. For these reasons, the successful control of coccidiosis is highly important to the poultry industry.

According to the present invention, certain organic compounds have been found to be highly effective in the treatment and prevention of coccidiosis due to the protozoan parasites *E. maxima, E. mitis, E. acervulina* and *E. brunetti*. One object of the invention, therefore, is to provide novel compositions containing such compounds. Another object is provision of animal feeds and feed supplements containing such compounds as active anticoccidial agents. A still further object is provision of a new method of controlling coccidiosis by administration of these substances to poultry susceptible to coccidiosis. Other objects will become evident from the following discussion of the invention. In accord with this invention, it has now been found that 2,4-disubstituted toluene compounds having the structural formula

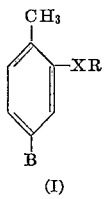

(I)

possess significant anticoccidial activity, and may be effectively used in the methods and compositions of the invention. In the above formula, X represents oxygen or sulfur, R is a lower alkyl or lower alkenyl group, representative examples of which are methyl, ethyl, propyl, butyl, allyl, methallyl and isopropyl radicals;

B may be nitro, amino, lower alkylamino, lower alkanoylamino, or benzoylamino. Typical alkylamino and alkanoylamino groups are methylamino, ethylamino, isopropylamino, acetylamino, propionoylamino, ethylamino, isopropylamino, acetylamino, propionoylamino, butyroylamino and the like. When B is a basic substituent such as amino or alkylamino, non-toxic acid addition salts such as the hydrochloride, sulfate, nitrate, or hydrobromide salts are contemplated by the invention.

The disubstituted toluenes of Formula I above may be prepared by the methods set forth in the literature. Several of such compounds have been previously made for other purposes so that detailed procedures for making them are known. Those which are not specifically described in the literature may be obtained from known substances by following the methods described for related compounds.

The 2,4-disubstituted toluene compounds of Formula I above are employed for the prevention and treatment of poultry coccidiosis by administering them to poultry susceptible to or infected with coccidia. This is normally accomplished by incorporating the coccidiostat in the feed or the drinking water of the birds. In terms of the total feed or liquid intake of the poultry, only minor amounts of coccidiostat are necessary for satisfactory control of the coccidial infection.

The optimal amount of 2,4-disubstituted toluene compound of this invention required for prevention of coccidiosis in poultry will vary to some degree depending upon the specific compound used and the severity of the coccidial infection. With 2-ethoxy-4-amino toluene (and acid addition salts thereof), 2-ethoxy-4-alkanoylamino toluene and 2-ethoxy-4-benzamido toluene, which substances are the preferred compounds of this invention, good results are obtained by administering to the poultry a finished feed containing from about 0.0003% to about 0.02% by weight of drug. Because of the variation in the degree and severity of infections it is preferred, however, to administer the compounds at levels of from about 0.001% to about 0.01% by weight of the feedstuff. In some instances, it may be desirable to employ levels of up to about 0.03% by weight of the feed although such higher dosages are not generally used for prophylactic treatment where the medicated feed is given continuously to the poultry but are of value in treating an established outbreak of coccidiosis. It will be appreciated by those skilled in this art that the lowest levels consonant with fully adequate control of coccidiosis and the development of immunity will be employed in most instances in order to eliminate as far as possible any risk of side effects that might be induced on prolonged feeding of unnecessarily high levels of these coccidiostats. The finished feed in which the coccidiostat is employed is a nutritionally adequate one containing sources of carbohydrate, protein, fat, vitamins, minerals and other nutritional factors commonly employed in commercial poultry raising.

In addition to administration to poultry by way of a solid feedstuff, the coccidiostats described herein may be administered by way of the drinking water. The preferred dose levels in the drinking water are usually somewhat less than those employed in a solid feed inasmuch as poultry drink about twice as much as they eat. Administration of these anticoccidial substances in the drinking water is of advantage when using the compounds thereapeutically. It is convenient to prepare dispersible or water-soluble powders in which the coccidiostat is intimately dispersed in a suitable carrier such as dextrose or sucrose at concentartions of from about 0.3% to about 25% by weight. These solids may then be conveniently added to the drinking water by the poultry raisers.

In addition to poultry feeds containing a minor amount of a compound of Formula I above as an effective anticoccidial agent, there are provided in accordance with an additional aspect of this invention poultry feed supplement compositions wherein the heretofore described 2,4-disubstituted toluene compound is intimately dispersed in or admixed with a suitable non-toxic diluent or carrier. The carrier vehicle employed in these supplement compositions should be one in which the coccidiostat is stable, which is compatible with a finished poultry feed and which can be administered with safety to the animals. These feed supplements, which contain a significantly higher percentage of coccidiostat than does the finished feed, are mixed with or blended into the feedstuff. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compounds described hereinabove may be formulated into feed supplement compositions containing from about 0.25% to about 30% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1–20% by weight of active ingredient are quite suitable.

The diluents normally employed for these poultry feed supplements are solid orally ingestible poultry feed additives such as distillers' dried grains, corn meal, citrus meal, fermentation residues, ground oyster shells, Attapulgus clay, wheat middling, wheat shorts, molasses solubles, corn cob meal, corn gluten feed, corn germ meal, edible vegetable substances, soybean meal, dehulled soya flour, soybean mill feed, antibiotic mycelia, crushed limestone, soya grits and the like. It is preferred, although not essential, that the carrier be a nutritive one.

Examples of typical feed supplements containing a coccidiostat of the present invention are:

| (A) | lbs. |
|---|---|
| 2-ethoxy-4-amino toulene hydrochloride | 1.0 |
| Wheat middlings | 99.0 |

| (B) | |
|---|---|
| 2-ethoxy-4-acetamido toluene | 2.5 |
| Soya grits | 65.0 |
| Toasted dehulled soya flour | 32.5 |

| (C) | |
|---|---|
| 2-ethoxy-4-nitro toluene | 2.5 |
| Corn distillers' grains | 97.5 |

| (D) | |
|---|---|
| 2-ethylthio-4-amino toluene hydrochloride | 5.0 |
| Corn gluten feed | 75.0 |
| Corn germ meal | 20.0 |

| (E) | |
|---|---|
| 2-ethoxy-4-amino toluene hydrochloride | 1.0 |
| Amprolium | 25.0 |
| Wheat middlings | 74.0 |

| (F) | |
|---|---|
| 2-ethoxy-4-benzamido toluene | 3.0 |
| 2-methyl-3,5-dinitrobenzamide | 25.0 |
| Corn distillers' dried grainst | 72.0 |

The toluene derivatives described herein are primarily effective against the *E. maxima* and *E. brunetti* species of coccidia and are less effective than many other coccidiostats against *E. tenella* and *E. necatrix*. Examples of such other coccidiostats are amprolium, nicarbazin, glycarbylamide, 3,5-dinitrobenzamide and 2-methyl-3,5-dinitrobenzamide. Thus, one of the purposes of this invention is to provide highly active broad spectrum anticoccidial compositions which comprise a compound of Formula I above and at least one other anticoccidial agent that is effective primarily against *E. tenella* and/or *E. necatrix*. In many cases the efficacy of such a combination is greater than would be expected from the activity of either coccidiostat alone.

The following examples are given for the purpose of illustration and not by way of limitation:

EXAMPLE 1

Anticoccidial activity of the compounds of this invention was determined in the following manner:

Straight run White Leghorn chicks, in groups of three each, were weighed and placed in cages with wire floors. They were fed ad libitum a standard laboratory ration in which graded concentrations of test compounds were blended just prior to use. In addition to the groups receiving the drug, normal and infected control birds were fed basal ration containing no test compounds. On the second day of the test the chicks were inoculated orally with 100,000 sporulated oocysts of *Eimeria maxima*. On the sixth day after inoculation all surviving birds were sacrificed and weighed. The small intestines were pooled in water and homogenized in a blender. Two aliquots of the homogenate were examined for oocysts in a hemocytometer. If the total count of oocysts was less than 30, the compounds were rated as active.

The activity of representative compounds of the invention is set forth below, the dose level being the minimum level at which the compound was active:

| Compound | Dose level (percent by wt. in feed) |
|---|---|
| 2-ethoxy-4-nitro toluene | 0.01 |
| 2-ethoxy-4-amino toluene hydrochloride | 0.00025 |
| 2-ethoxy-4-acetamido toluene | 0.00025 |
| 2-methoxy-4-amino toluene hydrochloride | 0.003 |
| 2-ethoxy-4-benzamido toluene | 0.005 |

EXAMPLE 2

2-ethoxy-4-acetamido toluene

Two grams of 2-ethoxy-4-amino toluene hydrochloride, obtained by catalytic reduction of 2-ethoxy-4-nitro toluene with platinum catalyst, is shaken at room temperature for twenty minutes with 10 ml. of 2.5 N sodium hydroxide solution and 2.0 gm. of acetic anhydride. 2-ethoxy-4-acetamido toluene precipitates and is removed by filtration. It is recrystallized from benzene to give substantially pure 2-ethoxy-4-acetamido toluene, M.P. 115–116° C.

In a similar fashion, 2-ethoxy-4-propionamido toluene, 2-methoxy-4-acetamido toluene, 2-ethylthio-4-acetamido toluene and 2-allyloxy-4-acetamido toluene are obtained from the corresponding 4-amino compound.

EXAMPLE 3

2-ethoxy-4-benzamido toluene 4.7 gm. of 2-ethoxy-4-amino toluene hydrochloride is stirred at room temperature for 30 minutes with 20 ml. of 2.5 N sodium hydroxide solution and 4 gm. of benzoyl chloride. The mixture is then made strongly alkaline with sodium hydroxide solution, and extracted with 3 x 10 ml. of ether. The ether extracts are combined and evaporated to a small volume in vacuo. 2-ethoxy-4-benzamido precipitates; it is removed by filtration and recrystallized from ethanol to give substantially pure 2-ethoxy-4-benzamido toluene, M.P. 146–147° C.

In like fashion 2-methoxy-4-benzamido toluene, 2-allyloxy-4-benzamido toluene and 2-ethylthio-4-benzamido toluene are prepared from the corresponding 2-substituted-4-amino toluene.

Any departure from the above description which conforms to the present invention is intended to be included within the scope of the claims.

What is claimed is:

1. The method of controlling poultry coccidiosis that comprises orally administering to poultry susceptible to coccidiosis an element of poultry sustenance containing an anticoccidial amount of a compound of the formula

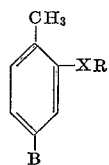

where X is selected from the class consisting of oxygen and sulfur, R is selected from the class consisting of lower alkyl and lower alkenyl, and B is selected from the class consisting of nitro, amino, lower alkylamino, lower alkanoylamino and benzoylamino groups.

2. The method of controlling poultry coccidiosis that comprises orally administering to poultry susceptible to coccidiosis an element of poultry sustenance containing from about 0.0003% to about 0.03% by weight of a member of the class consisting of 2-lower alkoxy-4-amino toluene and non-toxic acid addition salts thereof.

3. The method of controlling poultry coccidiosis that comprises orally administering to poultry susceptible to coccidiosis an element of poultry sustenance containing from about 0.0003% to about 0.03% by weight of 2-lower alkoxy-4-lower alkanoyl-amino toluene.

4. The method of controlling poultry coccidiosis that comprises orally administering to poultry susceptible to coccidiosis an element of poultry sustenance containing from about 0.0003% to about 0.03% by weight of 2-ehtoxy-4-amino toluene.

5. An anticoccidial composition comprising a poultry feedstuff having dispersed therein from about 0.0003% to about 0.03% by weight of a compound having the formula

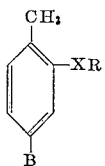

where X is selected from the class consisting of oxygen and sulfur, R is seletced from the class consisting of lower alkyl and lower alkenyl, and B is selected from the class consisting of nitro, amino, lower alkylamino, lower alkanoylamino and benzoylamino groups.

6. An anticoccidial composition comprising a poultry feed having distributed therein from about 0.0003% to about 0.03% by weight of a member of the class consisting of 2-lower alkoxy-4-amino toluene and non-toxic acid addition salts thereof.

7. An anticoccidial compositoin comprising a poultry feed having distributed therein from about 0.0003% to about 0.03% by weight of 2-ethoxy-4-amino toluene.

8. A poultry feed supplement composition that comprises a nutritive poultry feed additive containing a compound of the formula

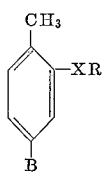

where X is selected from the class consisting of oxygen and sulfur, R is selected from the class consisting of lower alkyl and lower alkenyl, and B is selected from the class consisting of nitro, amino, lower alkylamino, lower alkanoylamino and benzoylamino groups.

9. A poultry feed supplement composition that comprises a nutritive poultry feed additive having distributed therein from about 0.5% to about 25% by weight of 2-lower alkoxy-4-amino toluene.

10. A poultry feed supplement composition that comprises a nutritive poultry feed additive having distributed therein from about 0.5% to about 25% by weight of a non-toxic acid addition salt of 2-lower alkoxy-4-amino toluene.

11. A poultry feed supplement composition that comprises a nutritive poultry feed additive having distributed therein from about 0.5% to about 25% by weight of 2-lower alkoxy-4-lower alkanoylamino toluene.

12. A poultry feed supplement composition that comprises a nutritive poultry feed additive having distributed therein from about 0.5% to about 25% by weight of 2-ethoxy-4-amino toluene.

References Cited by the Examiner

UNITED STATES PATENTS 3,081,224   3/63   Thorson _____ 167—53

OTHER REFERENCES

Drain: J. of Pharmacy and Pharmacology, vol. 1, 1949, pages 784–787.

JULIAN S. LEVITT, *Primary Examiner.*

FRANK CACCIAPAGLIA, Jr., *Examiner.*